(12) United States Patent
Goto et al.

(10) Patent No.: US 7,846,612 B2
(45) Date of Patent: Dec. 7, 2010

(54) FUEL CELL

(75) Inventors: Shuhei Goto, Utsunomiya (JP);
Katsuhiko Kohyama, Tsurugashima (JP); Ken Takahashi, Shimotsuga-gun (JP); So Fujiwara, Shioya-gun (JP); Ryugo Suzuki, Nishiibaraki-gun (JP); Narutoshi Sugita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 12/241,712

(22) Filed: Sep. 30, 2008

(65) Prior Publication Data
US 2009/0130524 A1 May 21, 2009

Related U.S. Application Data

(62) Division of application No. 10/704,227, filed on Nov. 6, 2003, now Pat. No. 7,445,865.

(30) Foreign Application Priority Data

Nov. 7, 2002 (JP) ............................. 2002-323950
Oct. 9, 2003 (JP) ............................. 2003-350541

(51) Int. Cl.
*H01M 8/02* (2006.01)

(52) U.S. Cl. ....................... 429/508; 429/507

(58) Field of Classification Search ....................... None
See application file for complete search history.

(56) References Cited

U.S. PATENT DOCUMENTS

| | | | | |
|---|---|---|---|---|
| 6,057,054 | A * | 5/2000 | Barton et al. ............... | 429/483 |
| 6,858,339 | B2 * | 2/2005 | Utsunomiya et al. ........ | 429/509 |
| 6,872,485 | B2 * | 3/2005 | Inoue et al. ................. | 429/492 |
| 6,875,533 | B2 * | 4/2005 | Diez .......................... | 429/454 |
| 6,921,598 | B2 | 7/2005 | Yamamoto et al. | |
| 6,998,186 | B2 | 2/2006 | Sato et al. | |
| 2003/0027031 | A1 | 2/2003 | Baldauf et al. | |
| 2003/0059664 | A1 | 3/2003 | Menjak et al. | |
| 2004/0038112 | A1 | 2/2004 | Mohri et al. | |
| 2004/0197633 | A1 | 10/2004 | Yamamoto et al. | |

(Continued)

FOREIGN PATENT DOCUMENTS

JP 58-10378 1/1983

(Continued)

OTHER PUBLICATIONS

Japanese Office Action for Application No. 2003-350541, dated Sep. 25, 2007.

*Primary Examiner*—Patrick Ryan
*Assistant Examiner*—Cynthia Lee
(74) *Attorney, Agent, or Firm*—Lahive & Cockfield, LLP; Anthony A. Laurentano

(57) ABSTRACT

A fuel cell includes a membrane electrode assembly, and first and second separators. A first insulating bushing is attached to a first positioning hole of a first separator, and a second insulating bushing is attached to a second positioning hole of the second separator. An inner wall of the first insulating bushing is fitted to an outer wall of the second insulating bushing for positioning the first and second separators such that the first and second separators are insulated from each other.

7 Claims, 12 Drawing Sheets

U.S. PATENT DOCUMENTS

2005/0064266 A1    3/2005   Abdou et al.

FOREIGN PATENT DOCUMENTS

| | | |
|---|---|---|
| JP | 9-7627 | 1/1997 |
| JP | 9-55221 | 2/1997 |
| JP | 9-134734 | 5/1997 |
| JP | 11-179755 | 7/1999 |
| JP | 11-309746 | 11/1999 |
| JP | 2000-012067 | 1/2000 |
| JP | 2001-338673 | 12/2001 |
| JP | 2002-305006 | 10/2002 |
| JP | 2003-157867 | 5/2003 |
| JP | 2003-187853 | 7/2003 |
| JP | 2004-14446 | 1/2004 |
| WO | WO-99/67845 A1 | 12/1999 |
| WO | WO-01/67532 A1 | 9/2001 |

* cited by examiner

FUEL CELL

RELATED APPLICATIONS

This application is a divisional of U.S. patent application Ser. No. 10/704,227 filed on Nov. 6, 2003 which claims priority to Japanese Patent Application No. 2003-350541, filed on Oct. 9, 2003 and Japanese Patent Application No. 2002-323950, Nov. 7, 2002, the contents of which are incorporated into this application in their entirety.

BACKGROUND OF THE INVENTION

1. Field of the Invention

The present invention relates to a fuel cell including an electrolyte electrode assembly, and first and second separators for sandwiching the electrolyte electrode assembly. The electrolyte electrode assembly includes a pair of electrodes and an electrolyte interposed between the electrodes.

2. Description of the Related Art

For example, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of a fuel cell (unit cell) for generating electricity.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

Generally, several dozen to several hundred of fuel cells are stacked together to form a fuel cell stack. In assembling the fuel cell stack, knock pins are inserted into positioning holes formed in each of the fuel cells for positioning the fuel cells with accuracy. However, if the number of the fuel cells is large, it is difficult to insert the knock pins in the positioning holes, and assembling operation may not be performed efficiently. Positional displacement between components may occur undesirably, and the desired sealing performance may not be achieved.

In an attempt to address the problem, Japanese patent publication No. 2000-12067 discloses a solid polymer electrolyte fuel cell 1 as shown in FIG. 12. The fuel cell 1 includes a unit cell 2 and separators 3a, 3b for sandwiching the unit cell 2. The unit cell 2 includes a solid polymer electrolyte membrane 2a, an anode 2b provided on one surface of the solid polymer electrolyte membrane 2a, and a cathode 2c provided on the other surface of the solid polymer electrolyte membrane 2a.

Holes 4 extend through the fuel cell 1 in a stacking direction of the fuel cell 1 for inserting holding pins 6. The separator 3b has openings 5 for inserting snap rings 7. The holding pin 6 has a snap ring attachment groove 6a. The holding pin 6 is inserted into the hole 4, the snap ring 7 is inserted into the opening 5, and the snap ring 7 is fitted to the snap ring attachment groove 6a. At one end of the holding pin 6, a chamfered tip 6b is formed. At the other end of the holding pin 6, a hole 6c for inserting the tip 6b of another holding pin 6 is formed.

As described above, in the system of the fuel cell 1, the holding pin 6 is inserted into the hole 4, and the snap ring 7 is inserted into the opening 5. The snap ring 7 is fitted to the snap ring attachment groove 6a for tightening the fuel cell 1.

Thus, the tip 6b of the holding pin 6 projecting from the outer surface of the separator 3b is fitted to the hole 6c of another holding pin 6 which tightens another fuel cell 1. In this manner, the adjacent fuel cells 1 are stacked in alignment with each other.

According to the disclosure of Japanese patent publication No. 2000-12067, a plurality of the holding pins 6 need to be inserted into the holes 4 for each of the unit cells 2. Further, the snap ring 7 needs to be fitted to each of the holding pins 6. Thus, when a large number of unit cells 2 are stacked together, assembling operation of the fuel cell 1 is considerably laborious, and can not be performed efficiently.

When the fuel cell 1 is assembled, the tip 6b of the holding pin 6 projects from the outer surface of the separator 3b. Thus, electrical leakage may occur from the tip 6b of the holding pin 6.

SUMMARY OF THE INVENTION

A main object of the present invention is to provide a fuel cell having a simple structure, in which separators can be stacked in alignment with each other easily and efficiently, and assembling operation of the fuel cell can be carried out efficiently.

According to the present invention, a first insulating positioning member is attached to a first positioning hole, and a second insulating positioning member is attached to a second positioning hole. Under the condition, the fuel cell can be assembled simply by fitting the first insulating positioning member and the second insulating positioning member together.

The first and second separators are accurately positioned with the simple and quick operation. The first and second separators are electrically insulated from each other. Even if a large number of the fuel cells are stacked together, no positional displacement occurs between the fuel cells. The fuel cells are stacked together highly accurately. Thus, the desired sealing performance can be maintained.

According to the present invention, the second insulating positioning member is inserted into the first insulating positioning member for positioning the first and second separators to assemble the fuel cell. Then, a recess of the second insulating positioning member of the fuel cell is fitted to a protrusion of the second insulating positioning member of the adjacent fuel cell. In this manner, the fuel cells are simply stacked in alignment with each other. Thus, the fuel cell stack can be assembled efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
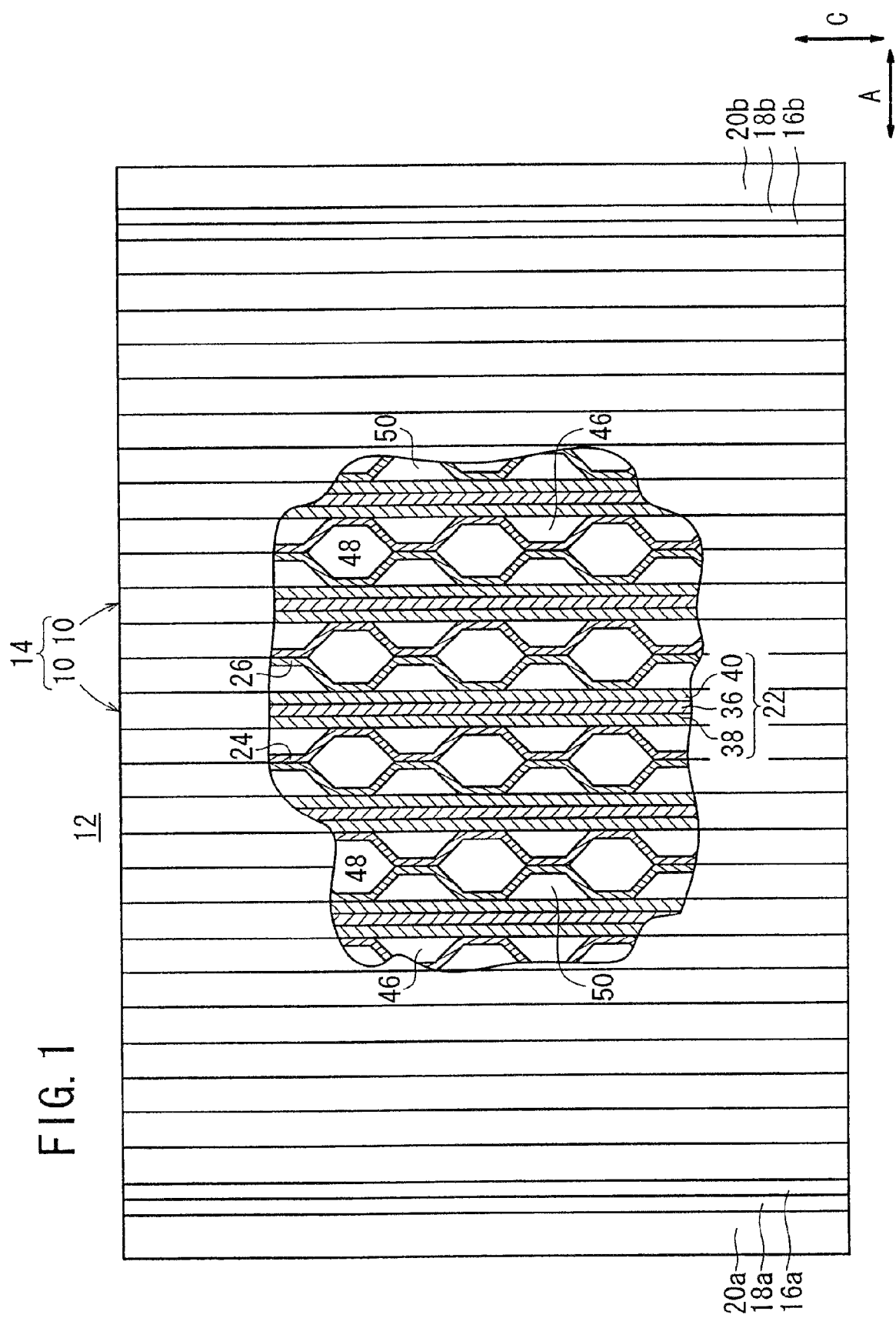
FIG. 1 is a view schematically showing a fuel cell stack including fuel cells according to a first embodiment of the present invention.

FIG. 1 is a view schematically showing a fuel cell stack 12 including fuel cells 10 according to a first embodiment of the present invention.

The fuel cell stack 12 includes a cell assembly 14 formed by stacking a plurality of the fuel cells 10 in a stacking direction indicated by an arrow A. Terminal plates 16a, 16b are provided at opposite ends of the cell assembly 14 in the stacking direction indicated by the arrow A. Insulating plates 18a, 18b are stacked on the outside of the terminal plates 16a, 16b, respectively. Further, end plates 20a, 20b are stacked on the outside of the insulating plates 18a, 18b, respectively. The cell assembly 14, the terminal plates 16a, 16b, the insulating plates 18a, 18b, and the end plates 20a, 20b are tightened together by applying a predetermined tightening force to the end plates 20a, 20b.

Figure 2:
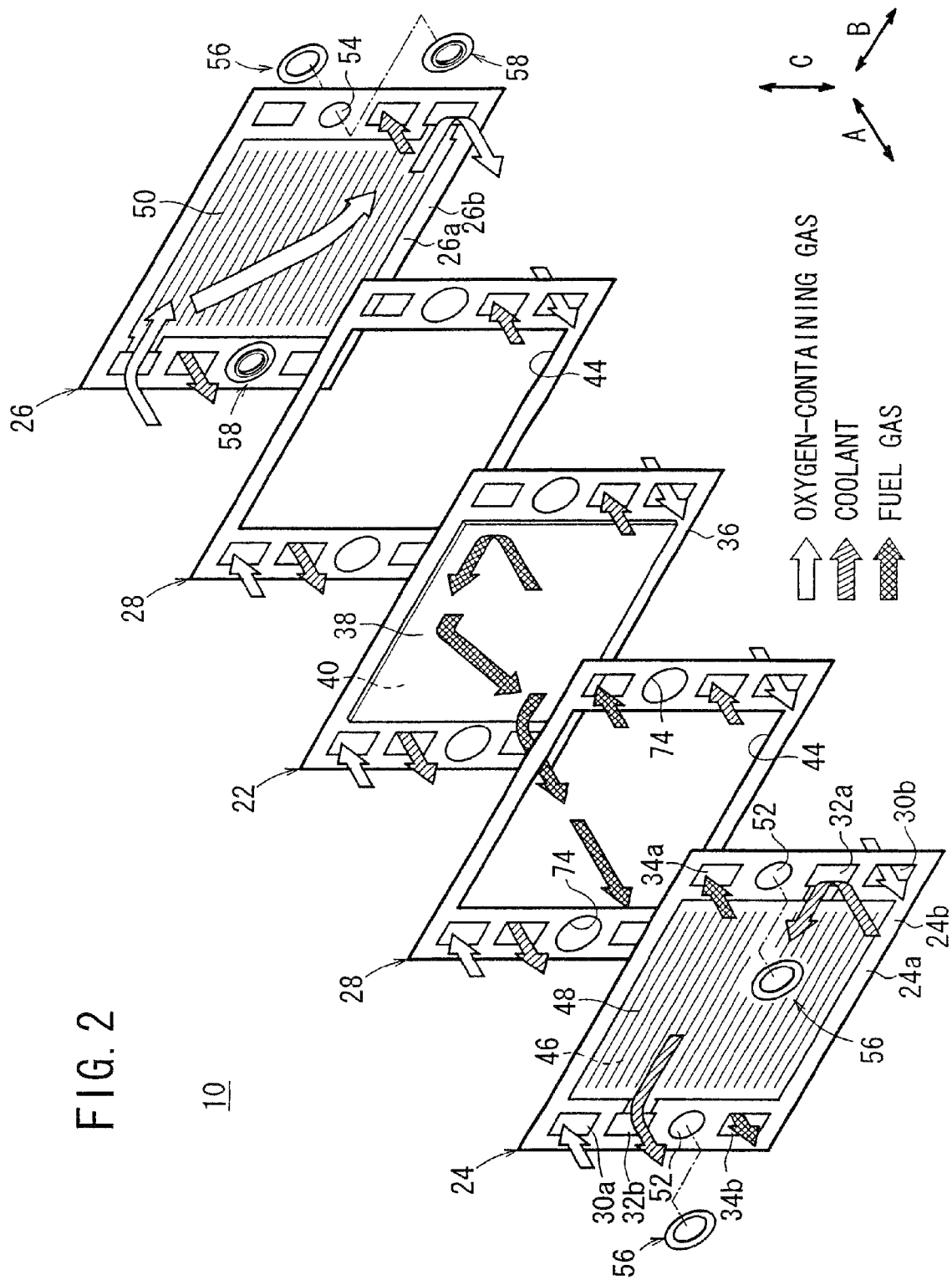
FIG. 2 is an exploded perspective view showing the fuel cell.

As shown in FIG. 2, the fuel cell 10 includes a membrane electrode assembly (electrolyte electrode assembly) 22 and first and second separators 24, 26 for sandwiching the membrane electrode assembly 22. Seal members 28 such as a gasket are provided between the membrane electrode assembly 22, and the first and second separators 24, 26 for sealing passages as described later and electrode surfaces (power generating surfaces). The first and second separators 24, 26 may be in the form of carbon plates. Alternatively, the first and second separators 24, 26 may be in the form of metal plates.

At one end of the fuel cell 10 in a direction indicated by an arrow B, an oxygen-containing gas supply passage 30a for supplying an oxygen-containing gas, a coolant discharge passage 32b for discharging a coolant, and a fuel gas discharge passage 34b for discharging a fuel gas such as a hydrogen-containing gas are arranged vertically in a direction indicated by an arrow C. The oxygen-containing gas supply passage 30a, the coolant discharge passage 32b, and the fuel gas discharge passage 34b extend through the fuel cell 10 in the stacking direction indicated by the arrow A.

At the other end of the fuel cell 10 in the direction indicated by the arrow B, a fuel gas supply passage 34a for supplying the fuel gas, a coolant supply passage 32a for supplying a coolant, and an oxygen-containing gas discharge passage 30b for discharging the oxygen-containing gas are arranged in the direction indicated by the arrow C. The fuel gas supply passage 34a, the coolant supply passage 32a, and the oxygen-containing gas discharge passage 30b extend through the fuel cell 10 in the stacking direction indicated by the arrow A.

The membrane electrode assembly 22 comprises an anode 38, a cathode 40, and a solid polymer electrolyte membrane 36 interposed between the anode 38 and the cathode 40. The solid polymer electrolyte membrane (electrolyte) 36 is formed by impregnating a thin membrane of perfluorosulfonic acid with water, for example. Each of the anode 38 and cathode 40 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively. Each of the seal members 28 has an opening 44 at a central position corresponding to the anode 38 or the cathode 40.

The first separator 24 has a fuel gas flow field 46 on its surface 24a facing the anode 38 of the membrane electrode assembly 22. The fuel gas flow field 46 is connected to the fuel gas supply passage 34a at one end, and connected to the fuel gas discharge passage 34b at the other end. The fuel gas flow field 46 comprises a plurality of grooves extending straight in the direction indicated by the arrow B, for example. Further, the first separator 24 has a coolant flow field 48 on its surface 24b opposite to the surface 24a. The coolant flow field 48 is connected to the coolant supply passage 32a at one end, and connected to the coolant discharge passage 32b at the other end. The coolant flow field 48 comprises a plurality of grooves extending straight in the direction indicated by the arrow B, for example.

The second separator 26 has an oxygen-containing gas flow field 50 on its surface 26a facing the cathode 40 of the membrane electrode assembly 22. The oxygen-containing gas flow field 50 is connected to the oxygen-containing gas supply passage 30a at one end, and connected to the oxygen-containing gas discharge passage 30b at the other end. The oxygen-containing gas flow field 50 comprises a plurality of grooves extending straight in the direction indicated by the arrow B, for example.

The first separator 24 has first positioning holes 52 between the coolant discharge passage 32b and the fuel gas discharge passage 34b, and between the fuel gas supply passage 34a and the coolant supply passage 32a. The two first positioning holes 52 are provided at opposite ends of the first separator 24. Similarly, the second separator 26 has second positioning holes 54 between the coolant discharge passage 32b and the fuel gas discharge passage 34b, and between the fuel gas supply passage 34a, and the coolant supply passage 32a. The two second positioning holes 54 are provided at opposite ends of the second separator 26.

Figure 3:
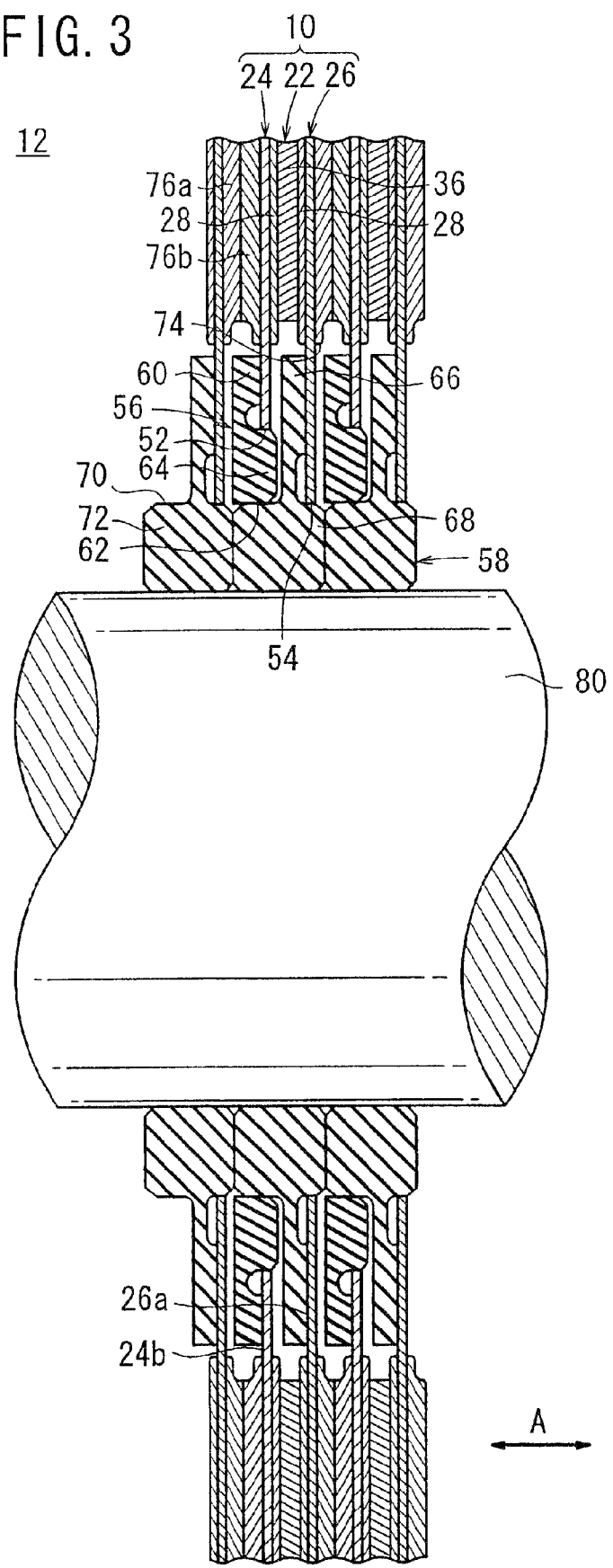
FIG. 3 is an exploded cross sectional view showing main components of the fuel cell.
Figure 4:
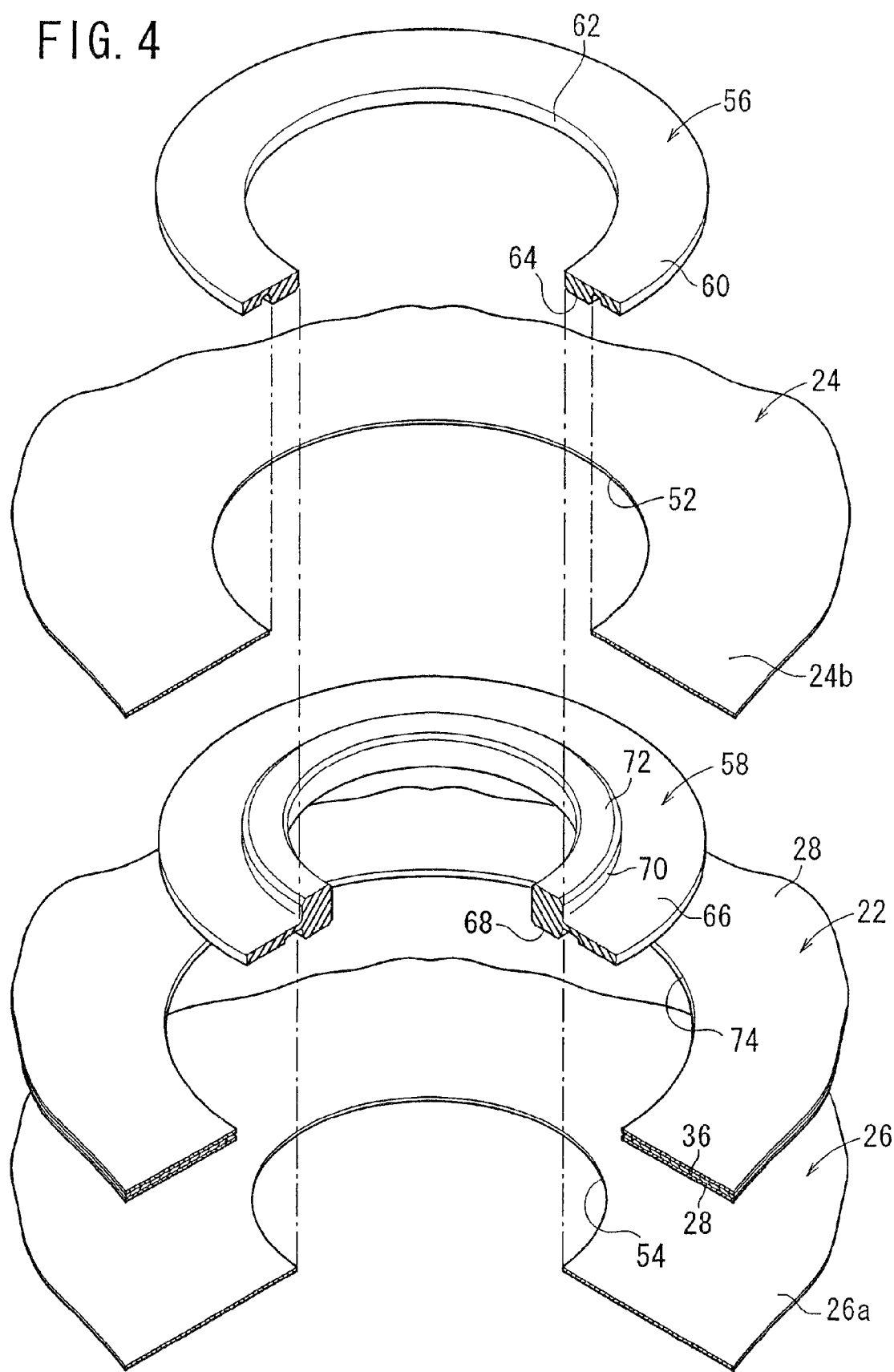
FIG. 4 is an exploded perspective view showing the main components shown in FIG. 3.

As shown in FIGS. 3 and 4, the first positioning hole 52 has a large diameter in comparison with the second positioning hole 54. A first insulating bushing (first insulating positioning member) 56 is attached to the first positioning hole 52, and a second insulating bushing (second insulating positioning member) 58 is attached to the second positioning hole 54. For example, the first and second insulating bushings 56, 58 are attached to the first and second positioning holes 52, 54 using adhesive such as silicon based adhesive.

The first and second insulating bushings 56, 58 are made of material having suitable properties for insulation, injection molding, hardness, such as PPS (Poly Phenylene Sulfide) or LCP (liquid crystal polymer).

The first insulating bushing 56 has substantially a ring shape. The first insulating bushing 56 includes a support section 60 which is in contact with one surface 24b of the first separator 24 for supporting the first separator 24. Further, the first insulating bushing 56 includes a thick section 64 which is fitted into the first positioning hole 52 of the first separator 24, and has an inner wall 62.

The second insulating bushing 58 has substantially a ring shape. The second insulating bushing 58 includes a support section 66 which is in contact with one surface 26a of the second separator 26 for supporting the second separator 26. Further, the second insulating bushing 58 includes a first thick section 68 which is fitted into the second positioning hole 54 of the second separator 26, and a second thick section 72 which has an outer wall 70 fitted to the inner wall 62.

A hole 74 extends through the membrane electrode assembly 22 and the seal members 28 in alignment with the first and second positioning holes 52, 54. Seal members 76a, 76b are interposed between adjacent fuel cells 10 (see FIG. 3).

Next, assembling operation of the fuel cell stack 12 will be described below.

In the fuel cell 10, the first insulating bushing 56 is attached to the first positioning hole 52 of the first separator 24, and the second insulating bushing 58 is attached to the second positioning hole 54 of the second separator 26.

As shown in FIG. 3, the support section 60 of the first insulating bushing 56 supports the surface 24b of the first separator 24, and the thick section 64 is fitted in the first positioning hole 52 of the first separator 24. The support section 66 of the second insulating bushing 58 supports the surface 26a of the second separator 26, and the first thick section 68 is fitted in the second positioning hole 54 of the second separator 26.

The seal members 28, and the membrane electrode assembly 22 are interposed between the first separator 24 and the second separator 26. The first insulating bushing 56 and the second insulating bushing 58 are pressed toward each other. Thus, the outer wall 70 of the second insulating bushing 58 is fitted to the inner wall 62 of the first insulating bushing 56. In this manner, positioning operation of the first and second separators 24, 26 is carried out.

As described above, in the first embodiment, the first insulating bushing 56 is fitted to the first positioning hole 52 of the first separator 24, and the second insulating bushing 58 is fitted to the second positioning hole 54 of the second separator 26. Under the condition, the first insulating bushing 56 and the second insulating bushing 58 are fitted together for positioning the first and second separators 24, 26. Thus, positioning operation is performed simply and rapidly with accuracy while the first and the second separators 24, 26 are insulated from each other. Accordingly, assembling operation of the fuel cell 10 is efficiently carried out.

Further, in assembling the fuel cell stack 12 including a plurality of fuel cells 10, as shown in FIG. 3, after the fuel cells 10 are suitably positioned by the first and second insulating bushings 56, 58, a knock pin 80 is inserted through the second insulating bushings 58. Thus, the large number of the fuel cells 10 can be suitably positioned, and assembled into the cell assembly 14 using the knock pin 80. At opposite ends of the cell assembly 14, the terminal plates 16a, 16b are provided, respectively. The insulating plates 18a, 18b are provided outside the terminal plates 16a, 16b, respectively. Further, the end plates 20a, 20b are provided outside the insulating plates 18, 18b. The cell assembly 14, and the other components are tightened together using unillustrated tie-rods.

Thus, no positional displacement occurs between the fuel cells 10. The fuel cells 10 are positioned in alignment with each other highly accurately, and the desired sealing performance can be maintained.

Next, operation of the fuel cell 10 of the fuel cell stack 12 will be described below.

In operation, an oxygen-containing gas such as air, a fuel gas such as a hydrogen-containing gas, and a coolant such as pure water, an ethylene glycol or an oil are supplied into the fuel cell stack 12 shown in FIG. 1. As shown in FIG. 2, the oxygen-containing gas flows through the oxygen-containing gas supply passage 30a into the oxygen-containing gas flow field 50 of the second separator 26. The oxygen-containing gas in the oxygen-containing gas flow field 50 flows along the cathode 40 of the membrane electrode assembly 22 to induce a chemical reaction at the cathode 40.

The fuel gas flows through the fuel gas supply passage 34a into the fuel gas flow field 46 of the first separator 24. The fuel gas in the fuel gas flow field 46 flows along the anode 38 of the membrane electrode assembly 22 to induce a chemical reaction at the anode 38. In the membrane electrode assembly 22, the oxygen-containing gas supplied to the cathode 40, and the fuel gas supplied to the anode 38 are consumed in the electrochemical reactions at catalyst layers of the cathode 40 and the anode 38 for generating electricity.

After the oxygen-containing gas is consumed at the cathode 40, the oxygen-containing gas flows into the oxygen-containing gas discharge passage 30b in the direction indicated by the arrow A. Similarly, after the fuel gas is consumed at the anode 38, the fuel gas flows into the fuel gas discharge passage 34b in the direction indicated by the arrow A.

The coolant supplied to the coolant supply passages 32a flows into the coolant flow field 48 of the first separator 24, and flows in the direction indicated by the arrow B. After the coolant is used for cooling the membrane electrode assembly 22, the coolant flows into the coolant discharge passages 32b.

Figure 5:
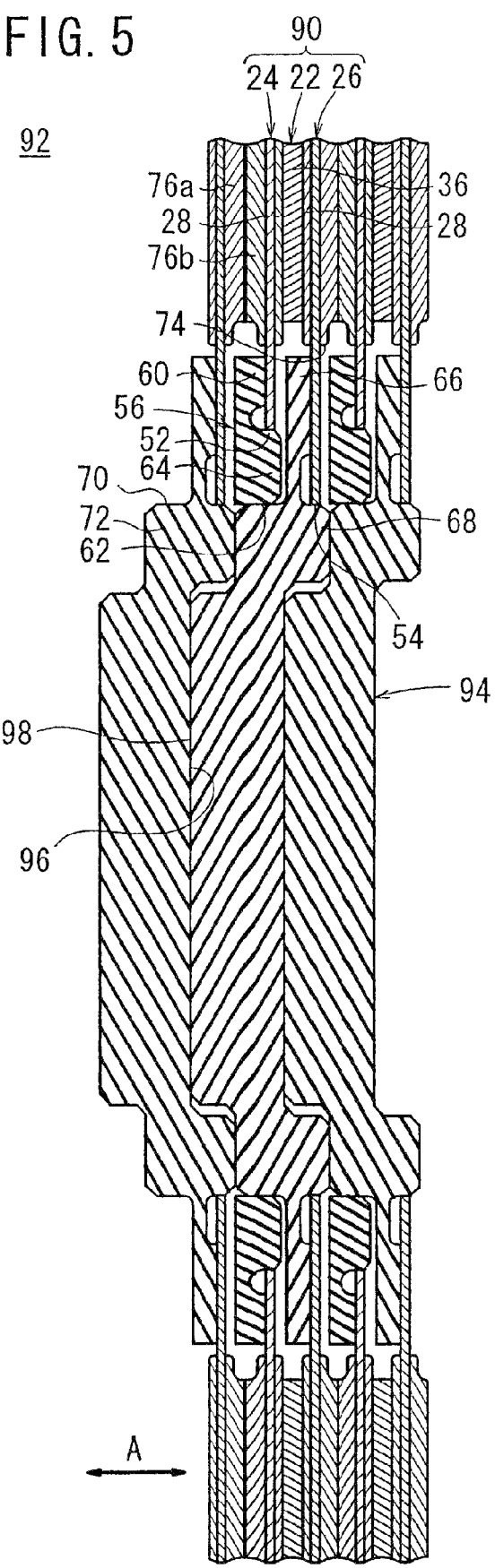
FIG. 5 is an enlarged cross sectional view showing main components of a fuel cell stack including fuel cells according to a second embodiment of the present invention.

FIG. 5 is an enlarged cross sectional view showing main components of a fuel cell stack 92 including fuel cells 90 according to a second embodiment of the present invention. The constituent elements that are identical to those of the fuel cell 10 according to the first embodiment are labeled with the same reference numeral, and description thereof is omitted. Similarly, in third through sixth embodiments of the present invention as described later, the constituent elements that are identical to those of the fuel cell 10 according to the first embodiment are labeled with the same reference numeral, and description thereof is omitted.

The fuel cell 90 includes a second insulating bushing (second insulating positioning member) 94 in place of the second insulating bushing 58 according to the first embodiment. The second insulating bushing 94 has a recess 96 provided inside the first thick section 68. Further, the second insulating bushing 94 has a protrusion 98 inside the second thick section 72. The protrusion 98 protrudes in an axial direction (in the stacking direction).

In the second embodiment, no knock pins 80 are used for positioning the fuel cells 90 in alignment with each other. The recess 96 of the second insulating bushing 94 of one fuel cell 90 is fitted to the protrusion 98 of the second insulating bushing 94 of the adjacent fuel cell 90 for positioning the second insulating bushings 94 when these fuel cells 90 are stacked together.

The fuel cells 90 each having the second insulating bushing 94 are suitably positioned, and stacked together in the direction indicated by the arrow A to form the desired fuel cell stack 92. Assembling operation of the fuel cell stack 92 can be carried out rapidly and efficiently. Sealing performance of the fuel cell stack 92 is not degraded due to positional displacement between the fuel cells 90.

Figure 6:
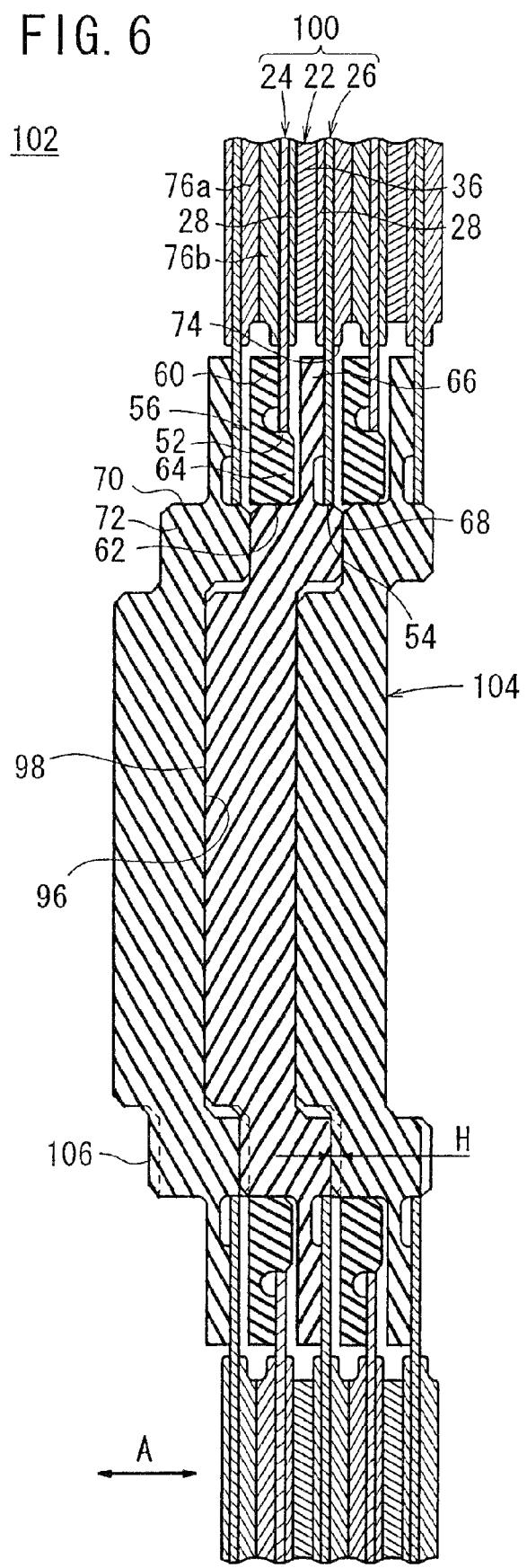
FIG. 6 is an enlarged cross sectional view showing a fuel cell stack including fuel cells according to a third embodiment of the present invention.
Figure 7:
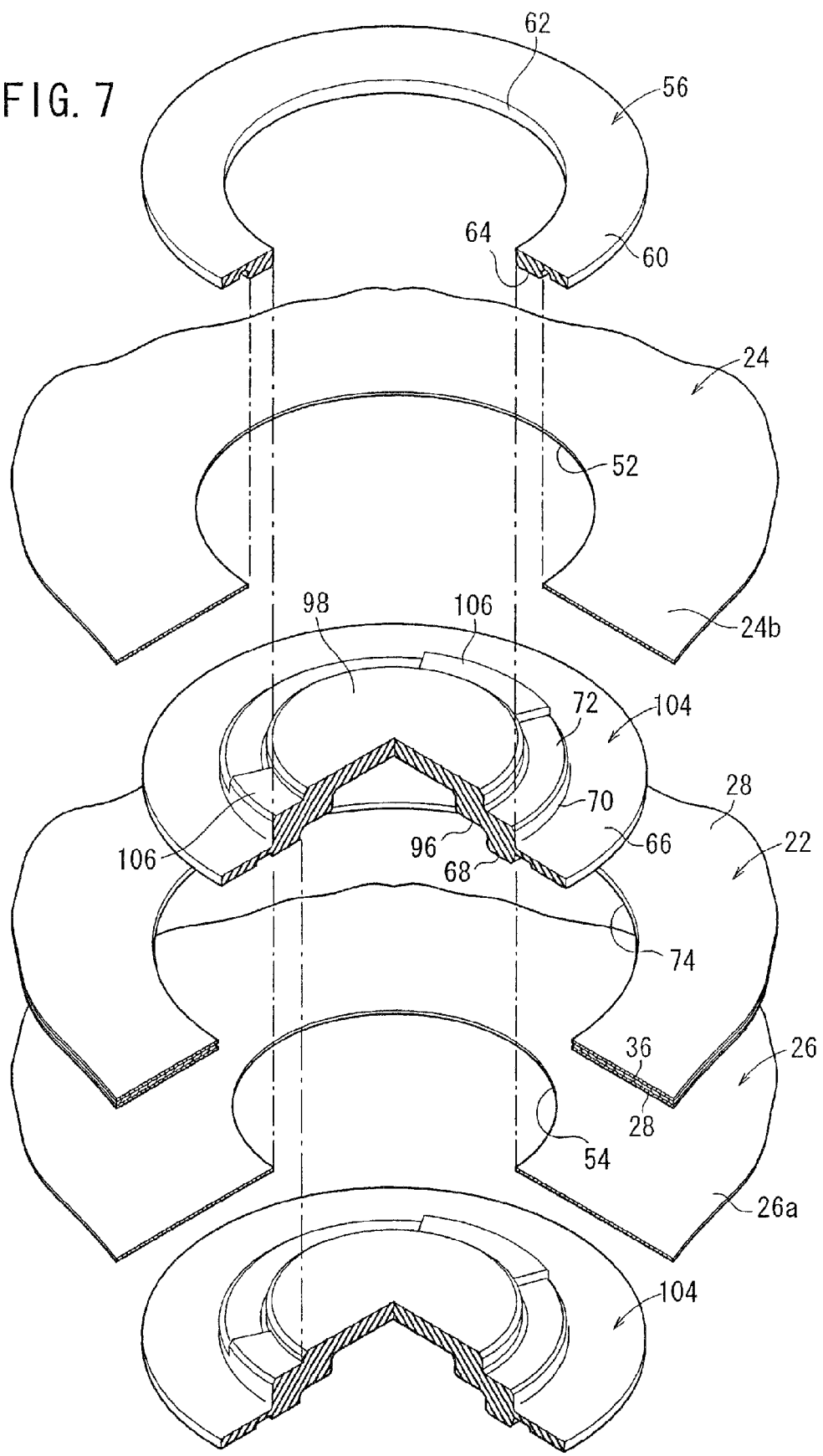
FIG. 7 is an exploded perspective view showing the main components of the fuel cell shown in FIG. 6.

FIG. 6 is an enlarged cross sectional view showing a fuel cell stack 102 including fuel cells 100 according to a third embodiment of the present invention. FIG. 7 is an exploded perspective view showing the main components of the fuel cell 100. The constituent elements that are identical to those of the fuel cell 90 according to the second embodiment are labeled with the same reference numeral, and description thereof is omitted.

The fuel cell 100 includes a second insulating bushing (second insulating positioning member) 104 in place of the second insulating bushing 94 according to the second embodiment. The second thick section 72 of the second insulating bushing 94 has a plurality of (e.g., two, three, or four) steps 106 extending over a predetermined angle. The steps 106 are expanded toward the protrusion 98.

In the third embodiment, the axial length of the outer wall 70 fitted to the inner wall 62 of the first insulating bushing 56 is increased by a distance H (see FIG. 6). The dimension of the contact area between the inner wall 62 and the outer wall 70 is increased by the distance H. Thus, the first insulating bushing 56 and the second insulating bushing 104 can be positioned more accurately.

Figure 8:
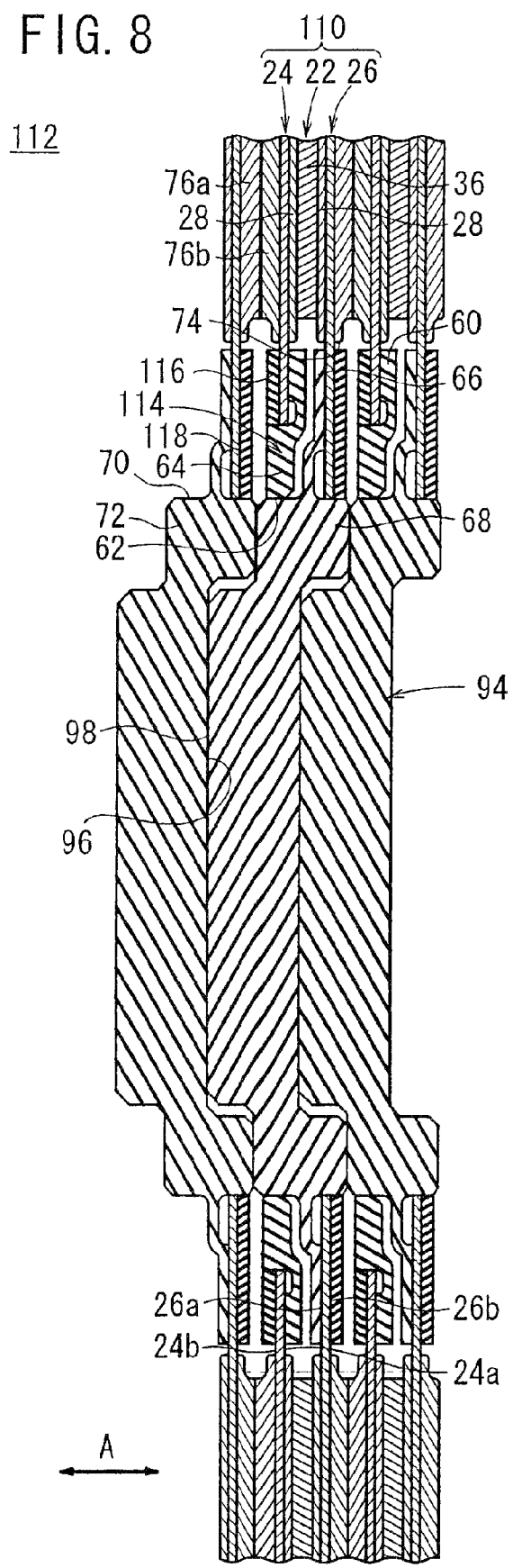
FIG. 8 is an enlarged cross sectional view showing main components of a fuel cell stack including a fuel cells according to a fourth embodiment of the present invention.
Figure 9:
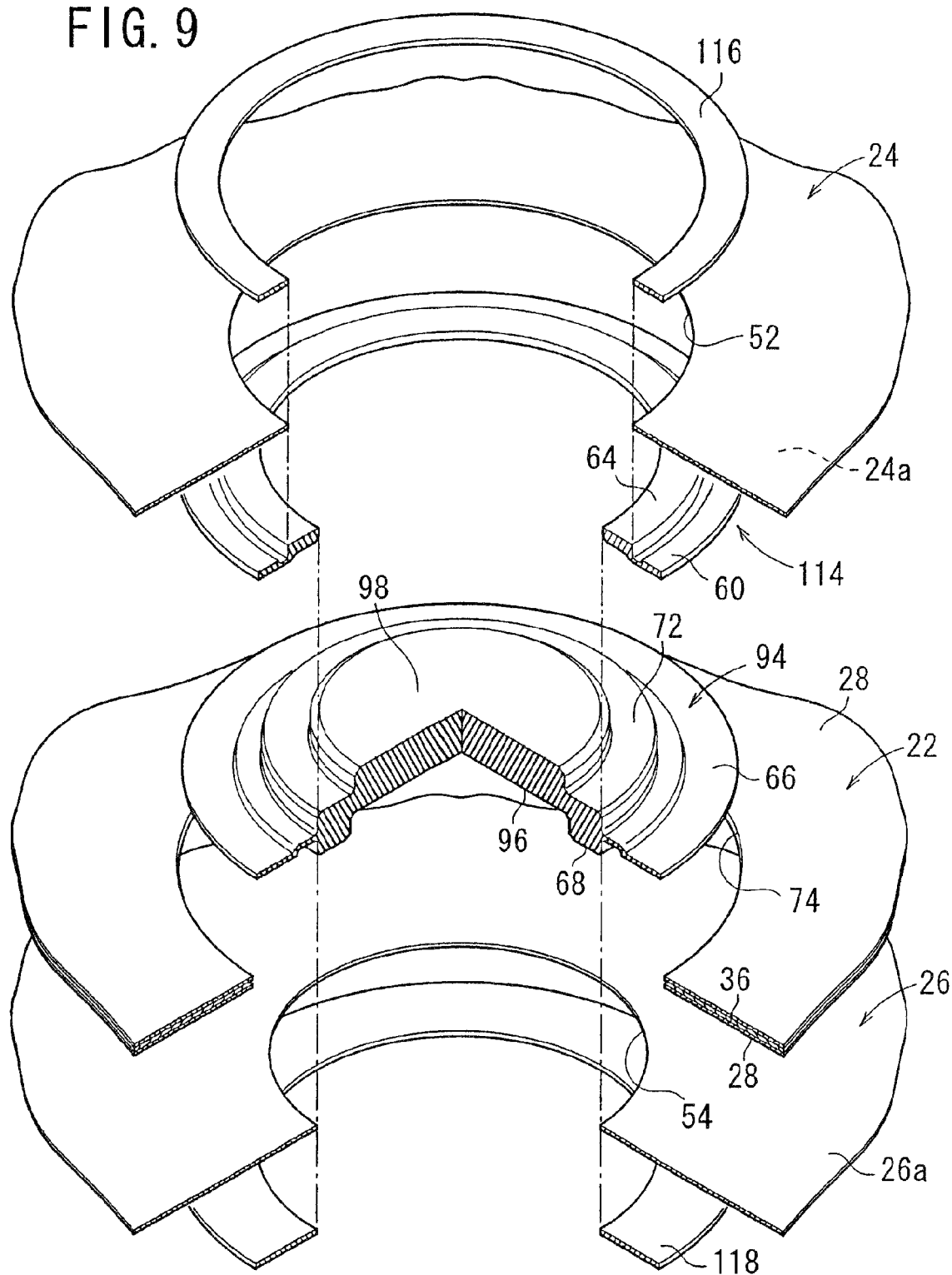
FIG. 9 is an exploded perspective view showing the main components of the fuel cell shown in FIG. 8.

FIG. 8 is an enlarged cross sectional view showing main components of a fuel cell stack 112 including fuel cells 110 according to a fourth embodiment of the present invention. FIG. 9 is an exploded perspective view showing the main components of the fuel cell 110.

The fuel cell 110 includes a first insulating bushing (first insulating positioning member) 114 attached to the first separator 24, a second insulating bushing (second insulating positioning member) 94 attached to the second separator 26, a first support member 116 for supporting the first separator 24, and a second support member 118 for supporting the second separator 26. The first and second support members 116, 118, and the first and second insulating bushings 114, 94 are made of same material. For example, the first and second support members 116, 118 are attached to the first and second separators 24, 26 using adhesive such as silicon based adhesive.

The first insulating bushing 114 includes a support section 60 for supporting the surface 24*a* of the first separator 24. The first support member 116 has a ring shape, and supports the surface 24*b* of the first separator 24. The first support member 116 is fitted to a thick section 64 of the first insulating bushing 114. The second insulating bushing 94 includes a support section 66 for supporting the surface 26*a* of the second separator 26. The second support member 118 has a ring shape, and supports the surface 24*b* of the second separator 26. The second support member 118 is fitted to a first thick section 68 of the second insulating bushing 94.

In the fourth embodiment as described above, the surface 24*a* of the first separator 24 is supported by the support section 60 of the first insulating bushing 114, and the surface 24*b* of the first separator 24 is supported by the first support member 116. The surface 26*a* of the second separator 26 is supported by the support section 66 of the second insulating bushing 94 and the surface 26*b* of the second separator 26 is supported by the second support member 118. Thus, the first and second separators 24, 26 are supported reliably with accuracy.

The first insulating bushing 114 and the first support member 116 are made of same material. Thus, even if the first insulating bushing 114 and the first support member 116 are peeled of from the first separator 24 due to the difference in thermal expansion, the first insulating bushing 114 is not peeled off from the first support member 116. When the first insulating bushing 114 and the first support member 116 are assembled into a unit having a U-shaped cross section, the unit is capable of supporting the end of the separator 24, and is not detached from the first separator 24.

Figure 10:
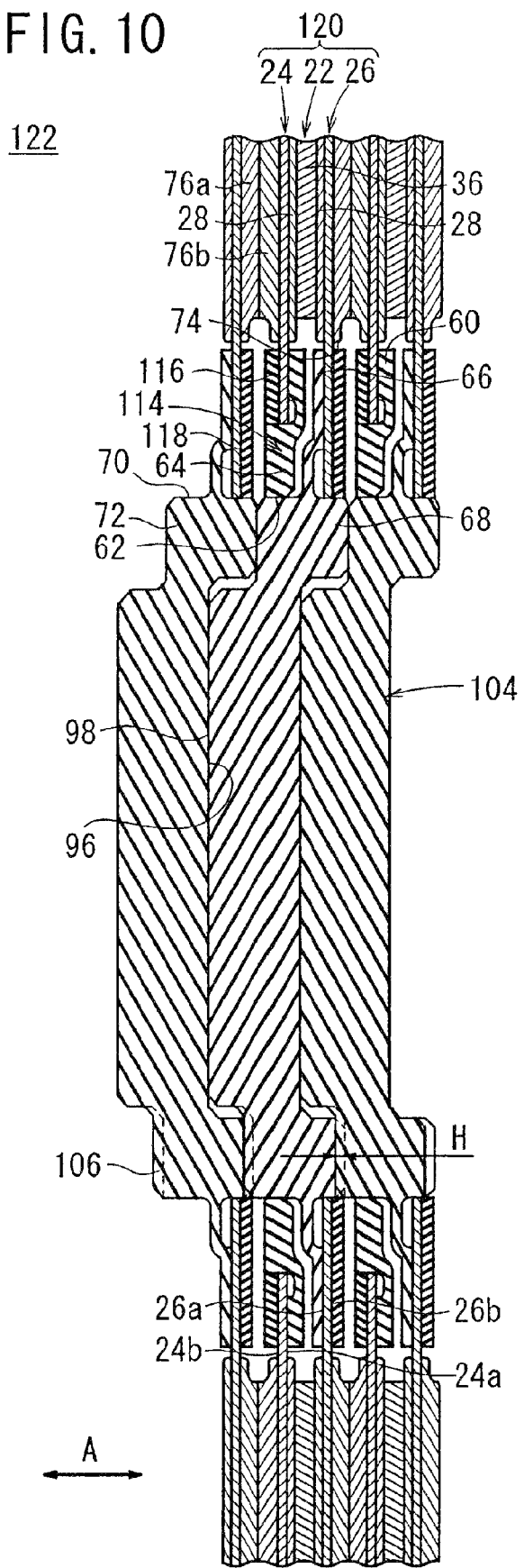
FIG. 10 is an enlarged cross sectional view showing main components of a fuel cell stack including fuel cells according to a fifth embodiment of the present invention.

FIG. 10 is an enlarged cross sectional view showing main components of a fuel cell stack 122 including fuel cells 120 according to a fifth embodiment of the present invention.

The fuel cell 120 includes the second insulating bushing (second insulating positioning member) 104 in place of the second insulating bushing 94 according to the fourth embodiment. In the fifth embodiment, both surfaces of the first and separators 24, 26 are reliably supported. The contact are between the first insulating bushing 114 and the second insulating bushing 104 is enlarged by a distance H. Thus, the first and second insulating bushings 114, 104 are reliably positioned in alignment with each other.

Figure 11:
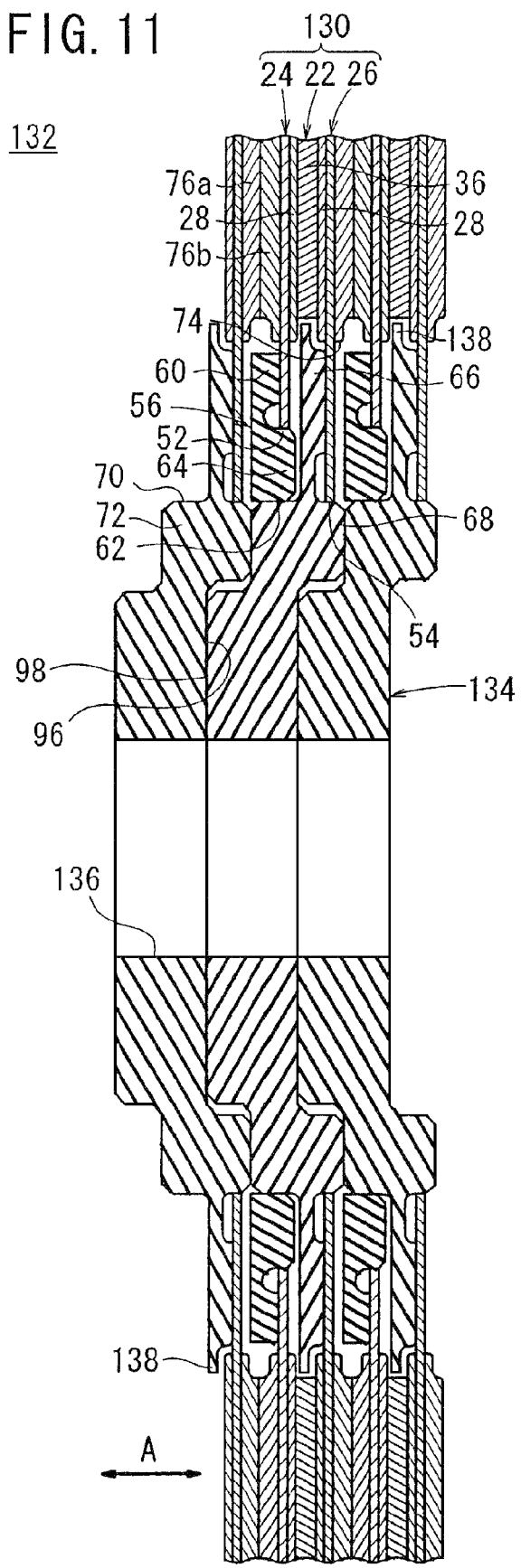
FIG. 11 is an enlarged cross sectional view showing main components of a fuel cell stack including fuel cells according to a sixth embodiment of the present invention.
Figure 12:
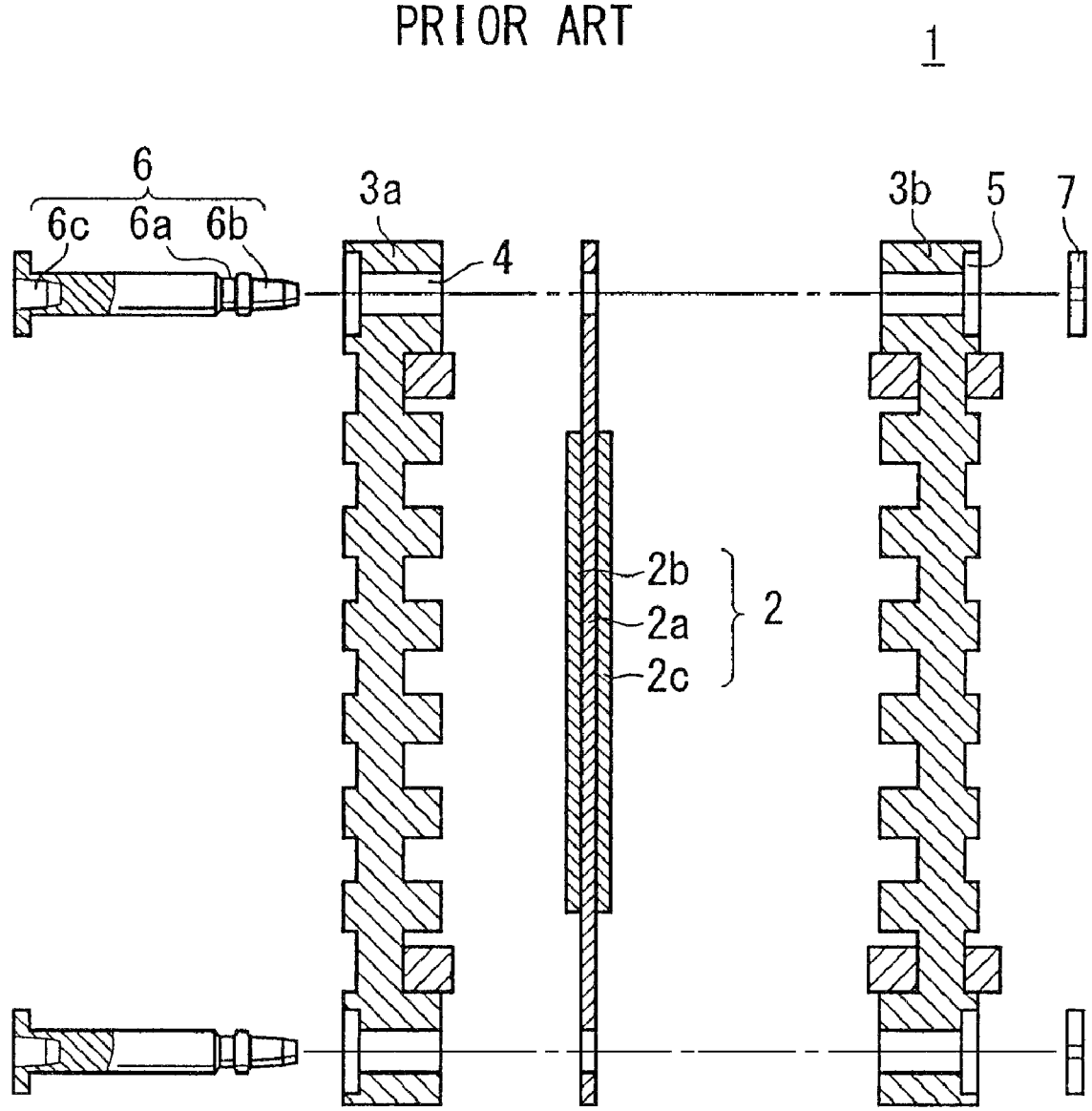
FIG. 12 is an exploded cross sectional view showing main components of a conventional fuel cell.

FIG. 11 is an enlarged cross sectional view showing main components of a fuel cell stack 132 including fuel cells 130 according to a sixth embodiment of the present invention.

The fuel cell 130 includes a second insulating bushing (second insulating positioning member) 134 in place of the second insulating bushing 94 according to the fourth embodiment. A hole 136 for inserting a knock pin is formed centrally in the second separator 134. An outer extension 138 is formed around the second insulating bushing 134, and the outer extension 138 is inserted between the seal members 28 provided on both surfaces of the membrane electrode assembly 22. The outer extension 138 and the seal members 28 are overlapped with each other.

As described above, in the sixth embodiment, the outer extension 138 formed around the second insulating bushing 134 is inserted between the seal members 28. Therefore, creepage distance between the adjacent first and second separators 24, 26 is long. Electrical short circuit between the adjacent first and second separators 24, 26 is prevented reliably.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
an electrolyte electrode assembly including a pair of electrodes and an electrolyte interposed between said electrodes;
first and second separators for sandwiching said electrolyte electrode assembly; and
first and second insulating positioning members, wherein:
said first separator has a first positioning hole, and said second separator has a second positioning hole;
said first insulating positioning member is attached to said first positioning hole, and said second insulating positioning member is attached to said second positioning hole;
a first wall of said first insulating positioning member, which faces toward said first positioning hole, is fitted to a second wall of said second insulating positioning member, which faces toward said electrolyte electrode assembly, for positioning said first and second separators such that said first and second separators are insulated from each other;
said first insulating positioning member includes a support section for supporting one surface of said first separator, and a section defining said first wall; and said second insulating positioning member includes a support section for supporting one surface of said second separator, a first section fitted to said second positioning hole and a second section defining said second wall, said second section protruding oppositely to said first section;

a first ring-shaped support member for supporting the other surface of said first separator, said first ring-shaped support member being fitted to said first insulating positioning member; and a second ring-shaped support member for supporting the other surface of said second separator, said second ring-shaped support member being fitted to said second insulating positioning member.

2. A fuel cell according to claim 1, wherein said first and second support members and said first and second insulating positioning members are made of same material.

3. A fuel cell according to claim 2, wherein said first support member and said first insulating positioning member are attached to said first separator using adhesive, and said second support member and said second insulating positioning member are attached to said second separator using adhesive.

4. A fuel cell comprising:

an electrolyte electrode assembly including a pair of electrodes and an electrolyte interposed between said electrodes;

first and second separators for sandwiching said electrolyte electrode assembly; and first and second insulating positioning members, wherein:
said first separator has a first positioning hole, and said second separator has a second positioning hole;
said first insulating positioning member is attached to said first positioning hole, and said second insulating positioning member is attached to said second positioning hole;
a first wall of said first insulating positioning member, which faces toward said first positioning hole, is fitted to a second wall of said second insulating positioning member, which faces toward said electrolyte electrode assembly, for positioning said first and second separators such that said first and second separators are insulated from each other; and
at least one of said first and second insulating positioning members includes an outer extension projecting toward said electrolyte electrode assembly.

5. A fuel cell according to claim 4, wherein said electrolyte electrode assembly is interposed between seal members, said outer extension is inserted between said seal members, and said outer extension and said seal members are overlapped with each other.

6. A fuel cell comprising:

an electrolyte electrode assembly including a pair of electrodes and an electrolyte interposed between said electrodes;

first and second separators for sandwiching said electrolyte electrode assembly; and first and second insulating positioning members, wherein:
said first separator has a first positioning hole, and said second separator has a second positioning hole;
said first insulating positioning member is attached to said first positioning hole, and said second insulating positioning member is attached to said second positioning hole;
said first insulating positioning member has a substantially ring shape;
said second insulating positioning member is fitted in said first insulating positioning member; and
said second insulating positioning member includes a protrusion protruding in a stacking direction of the fuel cell, and a recess defined inwardly in said stacking direction such that the protrusion of the adjacent second insulating positioning member is fitted in said recess.

7. A fuel cell according to claim 6, wherein said second insulating positioning member has an outer wall fitted to an inner wall of said first insulating positioning member and a step is projecting in said stacking direction from said outer wall.

* * * * *